Figure 1:
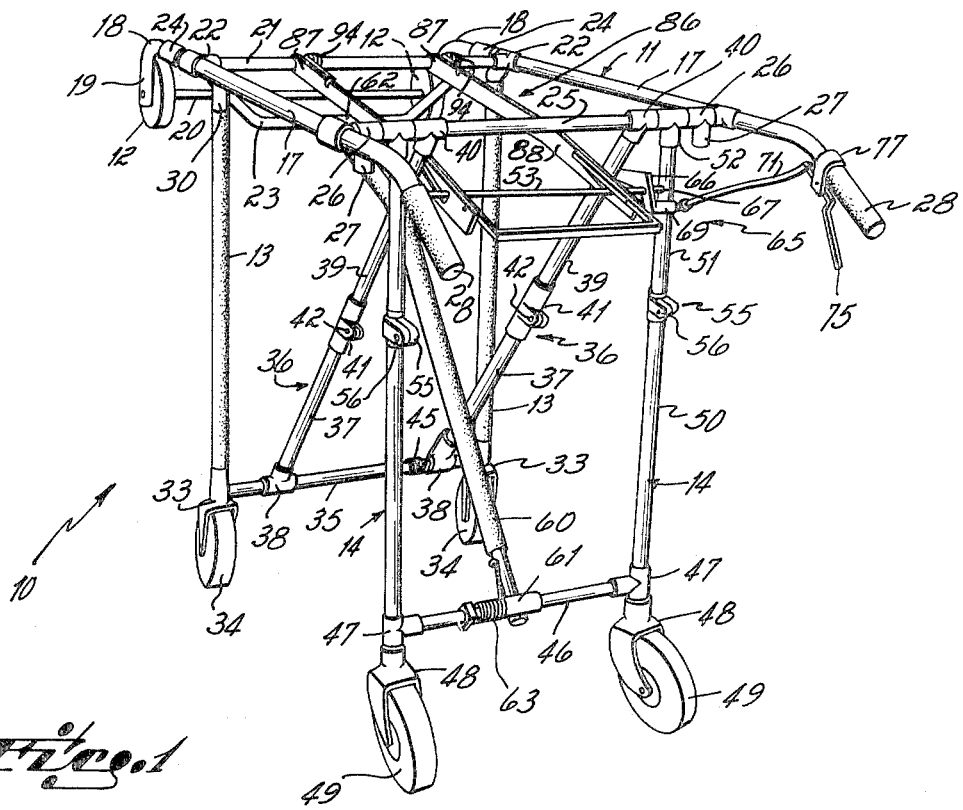

United States Patent
Bourgraf et al.

[15] 3,637,232
[45] Jan. 25, 1972

[54] CART HAVING COLLAPSIBLE LEGS

[72] Inventors: Elroy E. Bourgraf, Greenfield; Robert E. Dunn, Bloomingburg, both of Ohio

[73] Assignee: Burt Weil, Cincinnati, Ohio

[22] Filed: Oct. 2, 1969

[21] Appl. No.: 863,270

[52] U.S. Cl. ............................280/41, 280/36, 296/20
[51] Int. Cl. ..........................................................B62b 3/02
[58] Field of Search ..................280/36 A, 34, 34.2, 41, 47, 280/47.34, 47.35; 296/20

[56] References Cited

UNITED STATES PATENTS

| 2,841,438 | 7/1958 | Weil | 296/20 |
| 2,877,047 | 3/1959 | Weil | 296/20 |
| 2,877,048 | 3/1959 | Weil | 296/20 |
| 3,493,262 | 2/1970 | Ferneau | 296/20 |
| 3,498,628 | 3/1970 | Ferneau et al. | 280/36 |

Primary Examiner—Leo Friaglia
Assistant Examiner—Winston H. Douglas
Attorney—Wood, Herron & Evans

[57] ABSTRACT

A cart having a frame, auxiliary wheels on the forward end of said frame, four depending legs adapted to swing rearwardly to a collapsed position, releasable means bracing said legs, and an operator for actuating said releasable means, and a safety lock normally maintaining said operator inoperative.

7 Claims, 9 Drawing Figures

PATENTED JAN 25 1972

3,637,232

SHEET 1 OF 4

INVENTORS
Elroy E. Bourgraf
Robert E. Dunn
BY Wood, Herron & Evans
ATTORNEYS

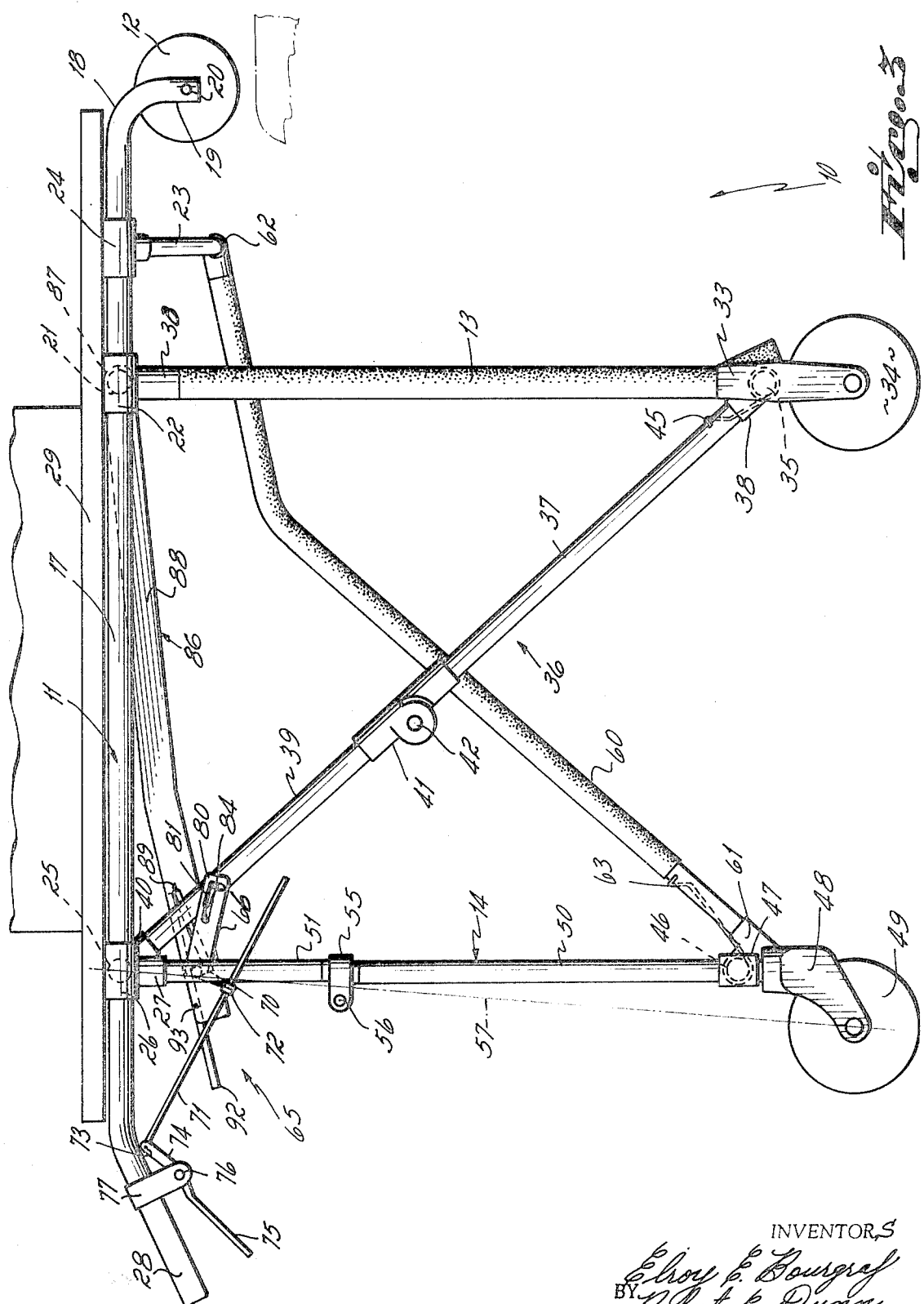

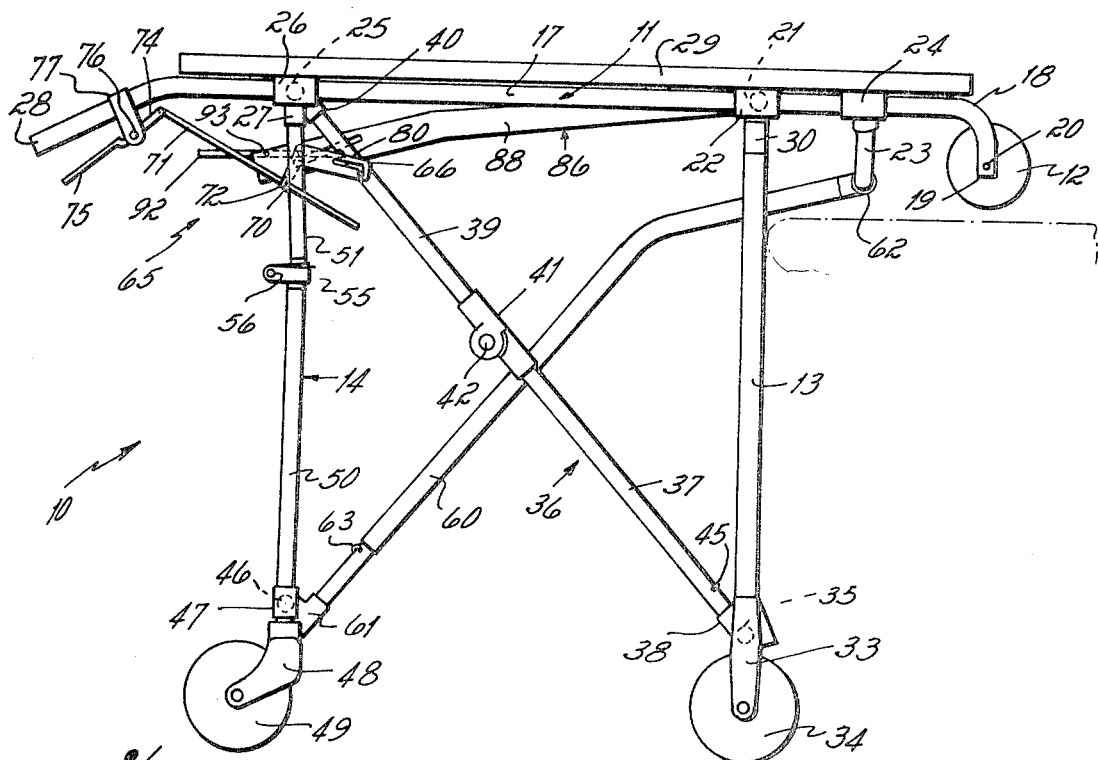

PATENTED JAN 25 1972
3,637,232
SHEET 4 OF 4
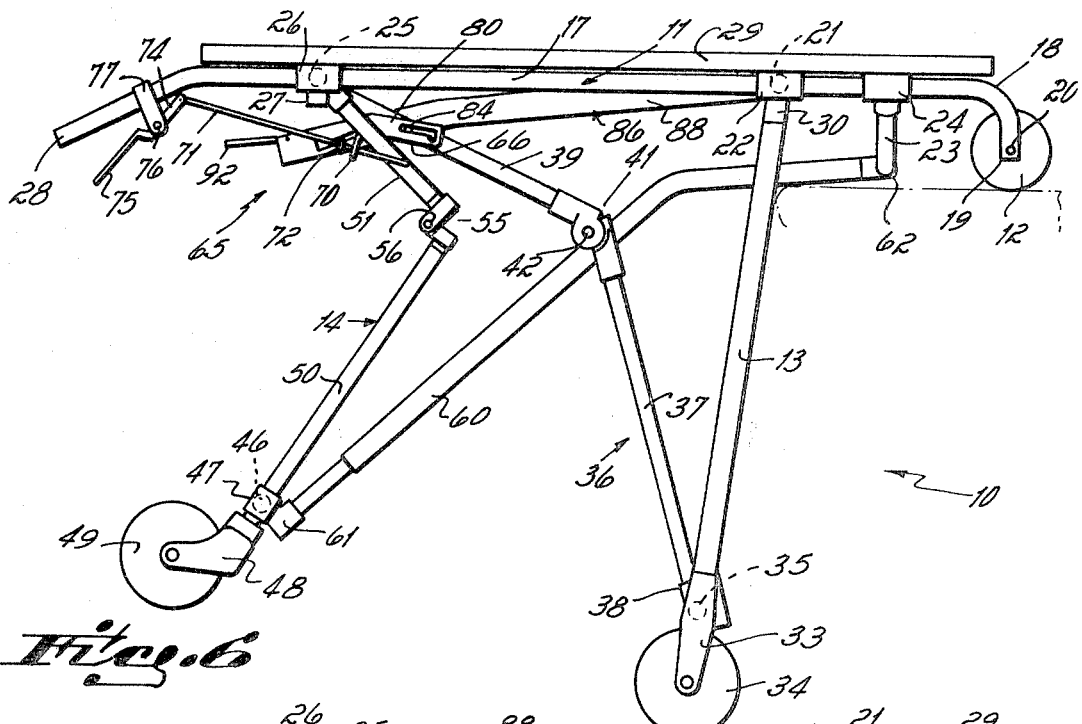
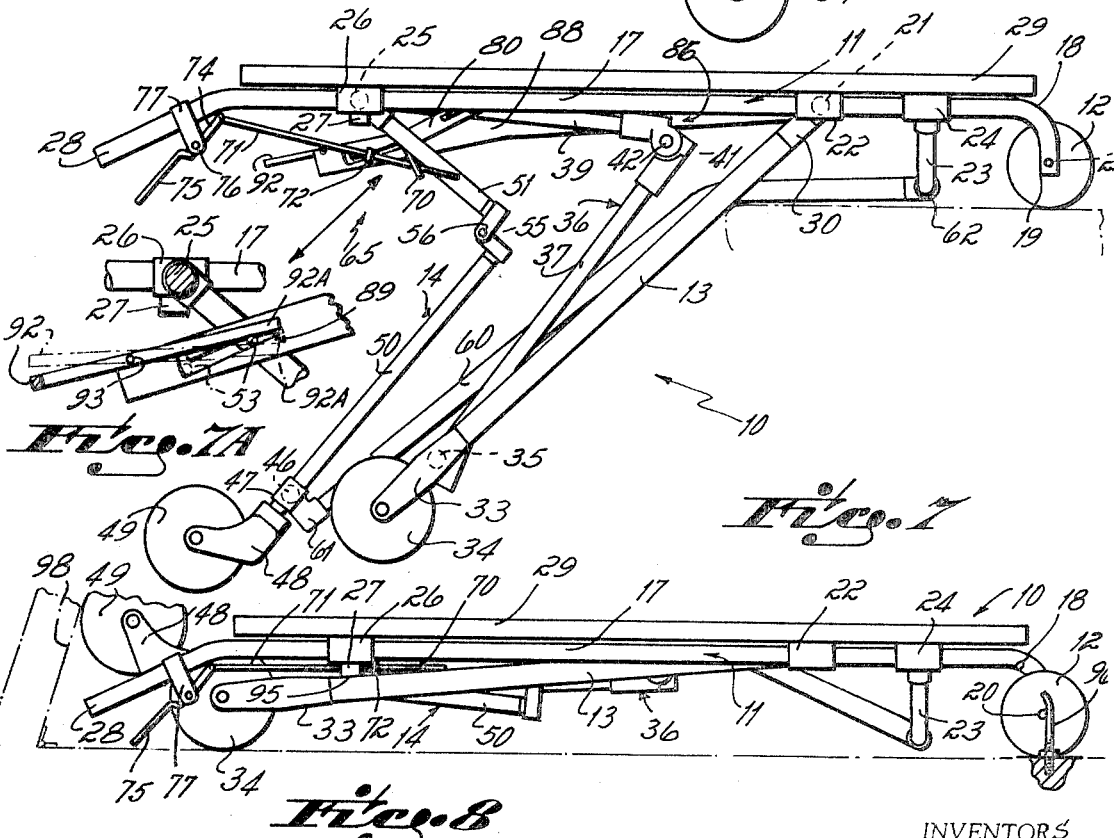
INVENTORS
Elroy E. Bourgraf
Robert E. Dunn
BY Wood, Herron & Evans
ATTORNEYS 3,637,232

1

CART HAVING COLLAPSIBLE LEGS

This invention relates to a cart which is particularly adapted for transporting articles, although the several features of the invention are not necessarily restricted to that use.

The invention is an improvement in the cart invented by Weil which is the subject of his U.S. Pat. Nos. 2,841,438; 2,877,047 and 2,877,048. The original Weil cart included a frame having auxiliary wheels on its forward end, depending legs pivoted to the frame, the depending legs being adapted to swing rearwardly. The objective of the invention was to permit a one-man operation of the cart wherein that man, standing at the rear of the cart, could roll the cart up to the rear of a vehicle, such as a hearse, ambulance or station wagon, and while the forward end of the cart was supported by the engagement of the auxiliary wheels of the loading platform of the vehicle, the operator, supporting the rear portion of the cart, could thrust the cart into the vehicle with the legs of the cart swinging rearwardly to lie generally horizontally beneath the frame of the cart.

In a copending application, Ser. No. 712,843 filed Mar. 13, 1968 now U.S. Pat. No. 3,493,262 owned by the assignee of the present application, there is described a cart which is an improvement in the original Weil cart, the improvement residing particularly in the structure of the rear legs. The rear legs are formed of two sections which are hinged together so that upon collapse of the rear legs the upper sections swing forwardly and the lower portions swing rearwardly. This structure permits a shorter overall length of the frame (or a longer wheel base, as the case may be) while avoiding interference with the man at the rear of the cart as the legs are swung rearwardly. In other words, the distance which the rear legs project rearwardly upon collapse is shortened by twice the length of the upper section of the legs over the structure of the original Weil cart.

An objective of the present invention has been to provide specific improvements in the structure of the cart of said copending application. One of the improvements has been to provide an operator for releasing the braced forward and rearward legs and to provide an improved automatic safety lock which renders the release operator inoperative when the legs of the cart are extended. Means are provided for disengaging the safety lock, which then maintains itself in "off" condition while the legs are released and collapsed but which automatically returns to an "on" condition when the legs are extended.

A further improvement has been to provide a structural interrelationship of the release operator and the forward and rearward legs, wherein the rearward swinging of the forward legs assists in the collapse of the rear legs. This feature is particularly useful in view of the use of the two-sectioned rear legs for, if the collapse of the rear legs can be effected wholly or in part of the swinging of the forward legs, the man thrusting the cart in the vehicle is not required to lift the rear end of the cart so high as would be necessary to permit the vehicle to engage the lower sections of the rear legs.

A further improvement has been in the placement of the hinge pin for the rear legs so that the axis of the hinge pin lies rearwardly of a line between the pivot axis of the upper section of the frame and the axis of the castered wheels in the lower ends of the legs. Through this hinge pin location, the weight of the cart tends to maintain the rear legs in their extended condition.

Still another improvement resides in the structure by which the frame is supported on the forward legs when the legs are collapsed so that the cart as a whole, when in the vehicle, is supported by the engagement of the auxiliary wheels and the wheels of the forward legs on the vehicle platform. This relationship enables a man to roll the cart to and from the inside of the vehicle and eliminates the strain which might otherwise be placed upon the man in having to lift the cart and a quite heavy object during the manipulation of the cart to and from the interior of the vehicle.

Figure 2:
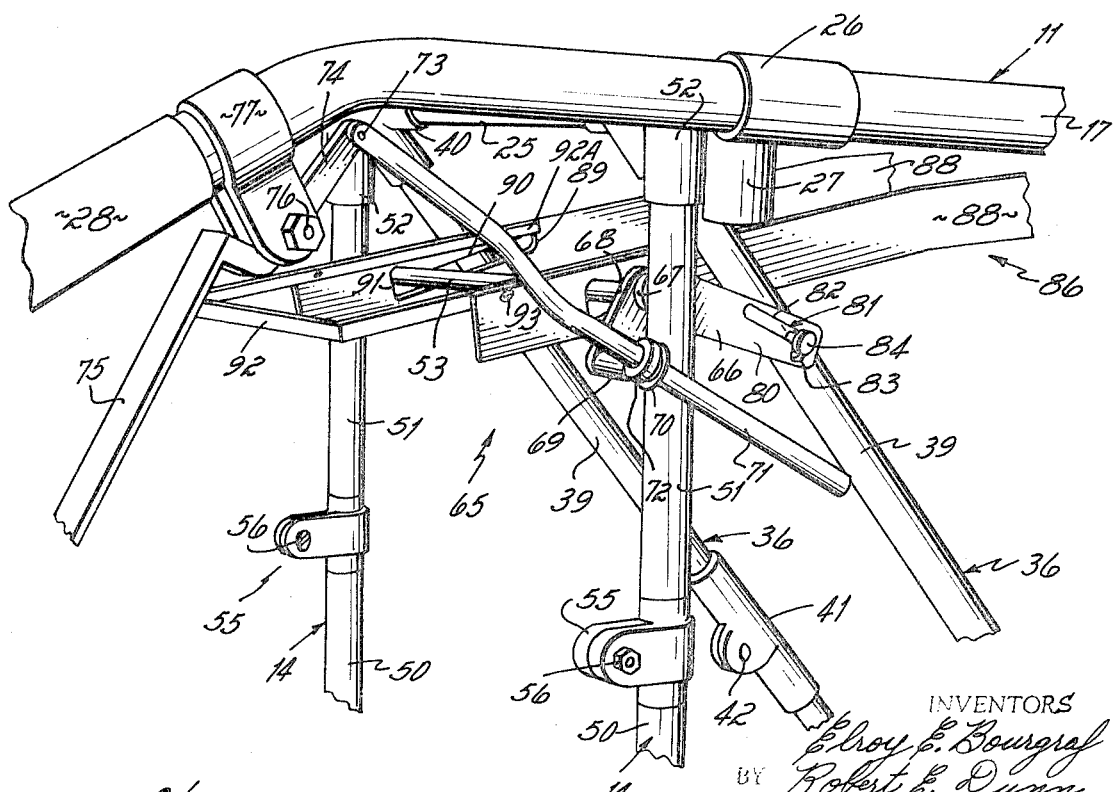

The several features of the invention will become more readily apparent from the following detailed description taken in conjunction with the accompanying drawings in which:

FIG. 1 is a perspective view of the cart of the present invention,

FIG. 2 is a fragmentary perspective view of the cart illustrating the release operator, FIG. 3 is a side elevational view of the cart, FIGS. 4 to 7 are side elevational views of the cart illustrating the stages in the collapse of the cart legs as the cart is thrust into a vehicle, FIG. 7A is a fragmentary side elevational view of the release operator mechanism when the cart is in the condition illustrated in FIG. 7, and FIG. 8 is a side elevational view of the cart shown in collapsed condition and maintained securely on the platform of the vehicle.

Referring to FIG. 1, the cart 10 includes a frame 11 having auxiliary wheels 12 on its forward ends, and having depending forward legs 13 and rearward legs 14. The frame is formed by two longitudinally extending bars 17, each bar having an L-shaped forward end 18, whose downwardly directed extension 19 supports the auxiliary wheels 12. The extensions 19 are interconnected by a transverse auxiliary rod 20 on which the auxiliary wheels are rotatably mounted.

A transverse bar 21 interconnects the forward ends of the longitudinal bars 17 and is fixed to the bars 17 by T-fittings 22. A U-shaped transverse bar 23 also interconnects the forward ends of the bars 17 and is fixed to the bars 17 by T-fittings 24. At the rear end of the frame, a transverse bar 25 is journaled in T-fittings 26 secured to longitudinal bars 17, the T-fitting 26 including a downwardly depending post 27. These posts are aligned with and engage the forward legs 13 when the legs are collapsed as will be explained below.

The rear ends of the longitudinal bars 17 are downwardly angulated and provide hand grips 28.

A rectangular platform 29 (FIG. 3) is mounted on top of the frame and is secured thereto by bolts threaded into the T-fittings 22 and 26.

Each forward leg 13 is secured at its upper end to a T-fitting 30, which is rotatably mounted on the transverse bar 21, thereby providing a pivotal axis which enables the legs to swing rearwardly. Wheel yokes 33 are fixed to the lower ends of the legs and carry wheels 34. A lower crossbar 35 is fixed to the wheel yokes 33. Toggle braces 36 have lower sections 37 rotatably mounted by T-fittings 38 to the lower crossbar 35. The braces 36 have upper sections 39 fixed by T-fittings 40 to the rotatable crossbar 25 at the rear end of the frame 11. The upper and lower sections are joined together by an overcenter hinge 41 having a hinge pin 42 lying outside the centerline of the brace. This overcenter relationship maintains the brace in extended condition until released in the manner to be described below.

A spring 45 wrapped about the crossbar 35 has one end fixed to the crossbar 35 and the other end bearing on the lower section 37 of one of the braces, the spring urging the brace and legs toward their extended condition.

The rear legs 14 are interconnected by a crossbar 46, the crossbar 46 being secured by T-fittings 47 at the lower ends of the legs. Caster yokes 48 are rotatably mounted on the lower ends of the legs and carry caster wheels 49.

Each leg 14 has a lower section 50 and an upper section 51. Each upper section is secured to a T-fitting 52, which is rotatably mounted on the crossbar 25. The upper sections are interconnected by a transverse rod 53. The lower sections 50 are hinged to the upper sections by an overcenter hinge 55, whose hinge pin 56 lies outside of a line 57 drawn between the axis of the crossbar 25 and the axis of the caster wheels 49 (see FIG. 3). This overcenter relationship utilizes the weight of the cart to maintain the rear legs in their extended condition. A diagonal brace 60 is rotatably mounted at 61 to the crossbar 46 on the rear legs, and at its upper end is rotatably mounted at 62 to the U-shaped frame member 23. A spring 63 mounted on the crossbar 46 has one end fixed to the crossbar and the other end bearing on the diagonal brace 60 in such a direction as to tend to maintain the rear legs in their extended condition. The forward legs 13 and the diagonal brace 60 are sheathed in a plastic material such as nylon for their surfaces engage the vehicle, the sheath providing protection to the legs and brace as well as the vehicle. The over center hinge 42 on each diagonal brace 36 and the over center hinge 55 on each leg 14 constitute releasable means for holding said legs in a vertical orientation.

The cart has an operator mechanism 65 which is best illustrated in FIG. 2. The operator mechanism includes a bellcrank lever 66 pivoted at 67 to the transverse rod 53 which interconnects the upper sections of the rear legs. The bellcrank lever has an arm 68 which carries a bushing 69 bearing against the upper section 51 of one of the rear legs. An eye bolt 70 is secured to the bushing and an operating rod 71 is slidably mounted within the eyebolt 70. A collar 72 is fixed on the rod 71 and bears against the eyebolt to effect the release operation to be described below. The lower end of the rod 71 is free and the upper end is pivoted as at 73 to an end 74 of an operating lever 75. The operating lever 75 is pivoted on a bolt 76 secured to a bracket 77 which is, in turn, fixed adjacent one of the handgrips 28.

It can be observed from FIG. 2 that a man with his hand on the handgrip 28 can squeeze the operating lever 75, causing it to pivot and in so pivoting to thrust the rod 71 downwardly, causing a rotation of the bellcrank lever 66.

The other arm 80 of the bellcrank lever 66 has an L-shaped slot 81, including a longitudinal leg 82 and a transverse leg 83. The slot 81 receives a pin 84 projecting from the upper section 39 of one of the diagonal braces 36. In pivoting the bell crank lever, the transverse leg of the slot captures the pin 84 and thrusts the diagonal brace 39 in such a direction as to release it from its overcenter bracing condition. Simultaneously, the boss 69 on the other arm of the bellcrank lever bears against the upper section 51 of the rear leg, causing it to begin to rotate to a released condition. The movement of the one leg causes the other leg to move through the force which is transmitted via transverse rod 53.

It can be seen that if the transverse rod 53 is blocked from movement the bellcrank lever cannot rotate and the brace for the forward leg cannot be released, and the upper sections of the rear legs cannot be pivoted towards a released condition. Blocking of the movement of the transverse rod 53 is effected by a safety lock 86 which is pivoted at its forward end 87 to the transverse bar 21 at the forward end of the frame. The safety lock is U-shaped having two legs 88, each of which has an L-shaped slot 89. The slot has a longitudinal portion 90, and a transverse latching portion 91 projects upwardly from the longitudinal portion and forms a latch which receives the transverse rod to form a locking means. The legs 88 are terminated at the rearward end by a U-shaped operating handle 92, forming a holding means, which projects to a position convenient to a man standing at the rear of the cart who can operate the lock with his knee or a hand. The handle 92 is pivotally mounted by bolts 93 intermediate its ends to the legs 88 of the safety lock 86, the bolts providing sufficient friction to retain the handle in an angulated position with respect to the legs. The handle presents free end portions 92A which overlie the slot 89. When the handle is pivoted upwardly to disengage rod 53 from transverse latching portion 91, the end portions 92A of the handle will overlie the transverse slot portion 91 and block reentry into it by the rod 53. Thus, the "safety" may be taken off and will remain off, permitting a man to place both hands on the hand grips and both feet on the ground before beginning the collapse of the legs. During collapse, as will appear below, rod 53 will cam the end portions back to their original position.

At the forward end of the lock, springs 94 are fixed to the transverse bar 21 and bear against the lock to urge it toward its locked condition.

In the operation of the invention, a man standing at the rear of a loaded cart rolls the cart up to the tailgate of a station wagon, for example, until the auxiliary wheels overlie the upper surface of the tailgate as shown in FIG. 3. When in this position, the cart is adapted to have its forward end supported by the tailgate and its rearward end supported by the man and thus he is in condition to effect the release of the legs.

To release the legs, the safety lock 86 is first swung upwardly until the transverse bar 53 is free of the transverse slot 91, and thus capable of swinging in a forward direction upon actuation of the operating lever. Substantially, simultaneously with the release of the lock, the operator actuates the operating lever 75, causing the bellcrank lever 66 to rotate. In rotating, the bellcrank lever 66 swings the upper sections 51 of the rear legs forwardly so that the transverse rod 53 begins to ride in the longitudinal portion 90 of the slot 89, wherein it is blocked from return to the latching transverse slot portion by the overlying end portions 92A of handle 92. Simultaneously, at the other arm of the bellcrank lever, the transverse slot 83 captures the pin 84 and thrusts it in an upwardly swinging direction to release the upper section 39 of the brace 36 which carries the pin. Rotational movement of one upper section 39 will be transmitted to the other upper section 39, since both sections are fixed to the rotatable crossbar 25 of the frame. These operations effect the release of the braces for the front and rear legs.

The man at the rear of the cart may then thrust the cart forward into the vehicle. During that forward thrust, the front legs engage the tailgate and are forced to swing upwardly and rearwardly toward a collapsed condition. As the forward legs swing upwardly, the upper section 39 of each brace is caused to rotate upwardly, one of the braces carrying the pin 84. The pin 84 rides out of the transverse slot portion 83 and into the longitudinal slot portion 82 of the bellcrank lever arm 80. At this point, the force relationship of the pin and bellcrank lever is reversed so to speak; that is, the bellcrank lever no longer applies force to the pin but rather the pin acts upon the bellcrank lever arm, causing the bellcrank lever to continue the rotation earlier begun by the actuation of the operating lever. This continued rotation is permitted by the sliding relationship of the eyebolt 70, with respect to the rod 71. Further rotation of the bellcrank lever causes the boss 69 to increase or further the swinging, toward collapsed condition, of the upper sections 51 of the rear legs. This condition begins to occur when the elements are in the condition shown in FIG. 5 and continues as the elements move into the position shown in FIGS. 6 and 7. As shown in FIG. 7, there is a substantial angulation between the upper and lower sections of the rear legs, that angulation being achieved in part by the operations described above and, in part, by the force applied to the diagonal brace 60 when it engages the tailgate of the station wagon.

As the thrust of the cart into the vehicle is continued, the front legs swing slightly past the position illustrated in FIG. 7 until the crossbar 35 moves into engagement with the diagonal brace 60. Thereafter, continued thrust of the cart in the vehicle causes the front and rear legs to swing together to the collapsed condition shown in FIG. 8. In the final stages of obtaining the collapsed condition, the posts 27 depending from the frame engage the forward legs as indicated at 95 in FIG. 8 so that the weight of the cart and contents rests upon the wheels 34 of the forward legs and front auxiliary wheels 12. The wheels of the forward legs and the auxiliary wheels provide a rolling support for the cart enabling it to be easily thrust completely into the vehicle and at a later time rolled out of the vehicle.

It is preferred to provide a stop bracket 96, bolted to the deck of the station wagon at a distance in front of the tailgate just sufficient to enable the tailgate to be closed when the rod 20 of the cart engages the stop. Thus, when the tailgate 98 is swung upwardly to a closed position, it confines the cart in a secure position between the tailgate and the stop.

As mentioned above, the cart cannot be collapsed while the rod 53 is engaged in the transverse slot portion 91. During the collapsing process, the lock is reset so that upon subsequent erection of the cart the cart will be locked in an erected position. Referring to FIG. 7A, it can be appreciated that as the rod 53 slides forward in the slot leg 90 during a cart collapse, the free ends 92A of the handle 92 are pivoted upwardly (from the phantom unlock position to the solid lock position) exposing the slot leg 91. Thus, when the cart is subsequently erected, the bar will engage the slot leg 91 to lock the cart in erection.

In removing the cart from the vehicle the tailgate is lowered, the cart is loaded slowly out until the legs pass beyond the tailgate, wherein their weight coupled with the springs urge them to an extended position, cause them to snap abruptly to the extended position illustrated in FIG. 3. During the removal of the cart, the transverse rod 53 slides along the longitudinal slot portion of the safety lock. When the legs snap into an extended position, the safety lock automatically pivots downwardly on the urging of the spring 94 to bring the transverse rod 53 and latching slot portion 91 into engagement.

We claim:

1. In a cart comprising,
   a horizontal frame,
   auxiliary wheels on the forward end of said frame,
   forward and rearward vertical legs pivoted at their upper ends to said frame,
   releasable means normally maintaining said legs vertically,
   and an operator mounted on said frame for releasing said releasable means,
   the improvement comprising,
   a safety lock mounted on said frame normally holding said operator in inoperative position,
   said safety lock including an elongated element pivotally mounted on said frame and having a latching slot portion,
   a transverse rod between said rear legs and receivable in said slot to block movement of said rear legs toward collapsed condition thereby forming a locking means,
   said elongated element being movable to an unlocked position to disengage said rod from said latching slot portion,
   a handle mounted on said elongated element for movement between a first position blocking entrance of said rod into said slot portion and a second position opening said slot portion to receive said rod,
   said handle being movable to said first position when said safety lock is shifted to inoperative position, and to said second position before said legs are returned to their normal extended position,
   whereby said legs may be pivoted to collapsed condition underlying said frame by first pivoting said elongated element to disengage said slot from said rod and thereafter actuating said operator while said handle holds said rod out of said slot.

2. A cart according to claim 1 further comprising spring means normally urging said safety lock to its holding position, whereby as said legs are returned to vertical condition they are automatically locked.

3. In a cart having a horizontal frame, handles on the rearward end of said frame, auxiliary wheels on the forward end of said frame, forward legs pivoted at their upper ends to said frame and adapted to swing rearwardly, a diagonal toggle brace extending from the lower ends of said forward legs to said frame adjacent said handles, rear legs pivoted at their upper ends to said frame, said rearward legs each being formed of an upper section pivotable forwardly, and a lower section hinged to said upper section and pivotable rearwardly, a diagonal brace extending from the lower ends of said rear legs to the forward portion of said frame, an operator for collapsing said legs comprising
   a bellcrank lever pivoted on said upper sections and having a first leg engaging at least one of said upper sections and a second leg engaging said toggle brace,
   an operating lever mounted on said frame and connected to said bellcrank lever to operate said lever to substantially simultaneously pivot said upper section and said brace to release said legs and permit them to collapse.

4. A cart according to claim 3 in which continued rearward pivoting of said forward legs forces said bellcrank lever to further urge said upper sections to pivot forwardly toward collapsed condition.

5. A cart according to claim 3 in which said second leg has a slot engaging a pin on said toggle brace,
   said slot having a first surface engaging said pin to pivot said brace to permit collapse of said forward leg, and
   said slot having a second surface engaged by said pin to force said bellcrank lever against said upper section, whereby collapse of said forward legs assists in the collapse of said rear legs.

6. A cart according to claim 3 in which said upper sections are fixed to a transverse bar journaled in and forming part of said frame, whereby pivoting one of said upper sections pivots the other of said upper sections.

7. A cart according to claim 6 further comprising a transverse bar interconnecting said upper sections and to which said bellcrank lever is pivoted, and a safety lock secured to said frame.

* * * * *